(12) United States Patent
Montoya et al.

(10) Patent No.: US 8,480,156 B2
(45) Date of Patent: Jul. 9, 2013

(54) VEHICLE INTERIOR TRIM ASSEMBLY AND CORRESPONDING VEHICLE DOOR

(75) Inventors: Ignacio Montoya, Valencia (ES); Gaspar Mateu, Valencia (ES)

(73) Assignee: Faurecia Interieur Industrie, Nanterre (FR)

( * ) Notice: Subject to any disclaimer, the term of this patent is extended or adjusted under 35 U.S.C. 154(b) by 73 days.

(21) Appl. No.: 13/308,792

(22) Filed: Dec. 1, 2011

(65) Prior Publication Data

US 2013/0140846 A1 Jun. 6, 2013

(51) Int. Cl.
*B60J 5/00* (2006.01)

(52) U.S. Cl.
USPC ........................................... 296/146.7

(58) Field of Classification Search
USPC ................. 296/146.7, 146.15, 146.6, 146.9, 296/187.05, 201, 210, 93; 24/295; 49/490.1; 280/728.3, 732; 52/208, 287.1, 288.1, 716.1, 52/716.5
See application file for complete search history.

(56) References Cited

U.S. PATENT DOCUMENTS

| | | | | |
|---|---|---|---|---|
| 2,137,652 A * | 11/1938 | Lundberg et al. | | 24/458 |
| 3,918,227 A * | 11/1975 | Gaston | | 52/283 |
| 4,189,885 A * | 2/1980 | Fritz | | 52/287.1 |
| 5,170,603 A * | 12/1992 | Bartlett | | 52/282.3 |
| 5,453,309 A * | 9/1995 | Shanok et al. | | 428/31 |
| 5,515,902 A * | 5/1996 | Hoffman | | 160/235 |
| 5,657,585 A * | 8/1997 | Zaccagni | | 52/94 |
| 5,704,107 A * | 1/1998 | Schmidt et al. | | 29/460 |
| 5,711,057 A * | 1/1998 | Dameron | | 24/499 |
| 5,711,117 A * | 1/1998 | Zaccagni et al. | | 52/94 |
| 5,947,547 A * | 9/1999 | Deeks et al. | | 296/146.7 |
| 6,167,897 B1 * | 1/2001 | Resso et al. | | 135/121 |
| 6,170,902 B1 * | 1/2001 | Sakuma et al. | | 296/146.6 |
| 6,179,359 B1 * | 1/2001 | Clauson et al. | | 296/39.1 |
| 6,619,722 B1 * | 9/2003 | Brown | | 296/136.05 |
| 6,837,005 B2 * | 1/2005 | Arata et al. | | 49/440 |
| 7,367,103 B2 * | 5/2008 | Schoemann et al. | | 29/527.1 |
| 7,371,341 B2 * | 5/2008 | Youngs et al. | | 264/238 |
| 7,424,795 B2 * | 9/2008 | Baxter et al. | | 52/718.02 |
| 7,462,024 B2 * | 12/2008 | Dooley et al. | | 425/125 |
| 7,536,830 B2 * | 5/2009 | Clark et al. | | 49/377 |
| 7,743,581 B2 * | 6/2010 | Shaw et al. | | 52/741.1 |
| 7,854,875 B2 * | 12/2010 | Dooley et al. | | 264/275 |
| 2007/0018434 A1 * | 1/2007 | Hayashi | | 280/728.3 |
| 2007/0176399 A1 * | 8/2007 | Kullack | | 280/728.3 |

* cited by examiner

*Primary Examiner* — Kiran B Patel
(74) *Attorney, Agent, or Firm* — Reising Ethington P.C.

(57) ABSTRACT

The interior trim assembly, comprising:
 a trim panel (16) comprising a panel screen (20) having a front surface (20A) and a rear surface (20B), the panel comprising a screen opening (24) extending through the panel screen (20);
 an insert (18) assembled to the rear surface (20A) of the panel screen (20), said insert (18) comprising an insert screen (26) covering at least partially the screen opening (24) and at least one support flange (28) extending from the insert screen (26) and resting on the rear surface (20B) of the panel screen (20), the insert (18) comprising a hooking flange (30) fitted into a groove (42) of the panel (16) in such a manner as to prevent the insert (18) from translating with respect to the panel (16) such that a support flange (28) moves away from the rear surface (20B) of the panel screen (20).

12 Claims, 3 Drawing Sheets

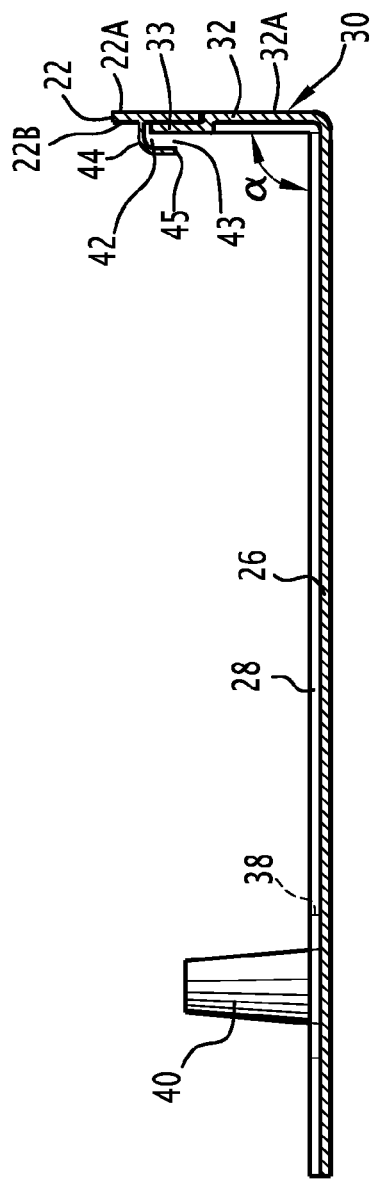
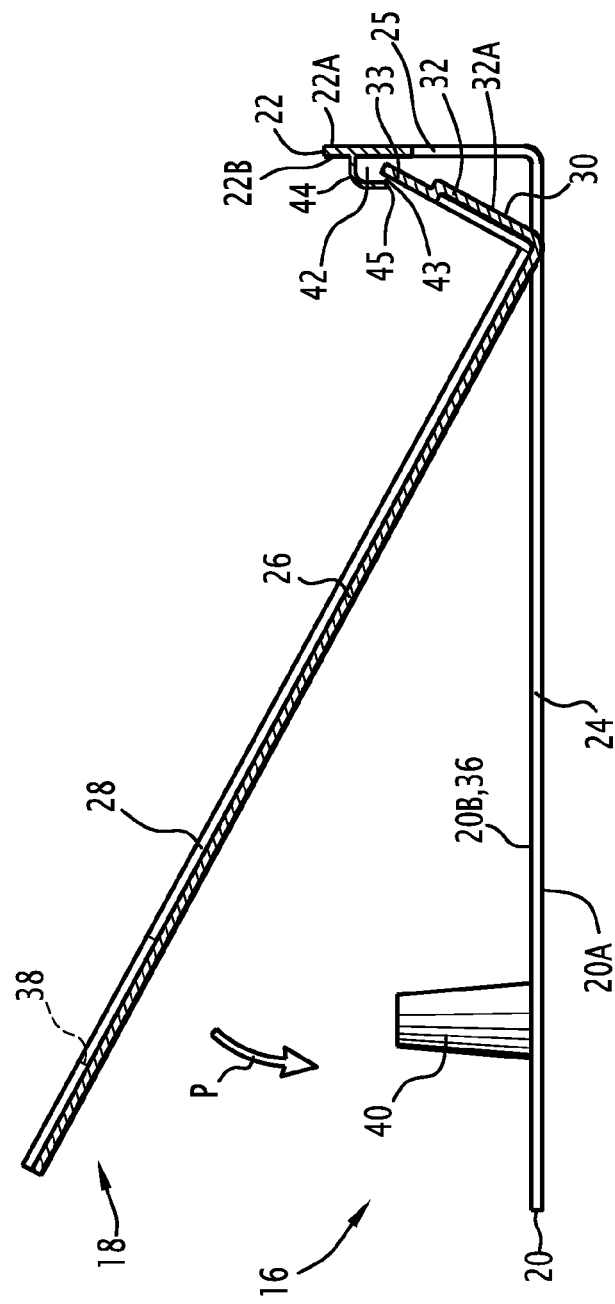

VEHICLE INTERIOR TRIM ASSEMBLY AND CORRESPONDING VEHICLE DOOR

The present invention relates to interior trim assemblies for vehicles, namely automotive vehicles.

DE 198 46 419 discloses an automotive vehicle door interior trim assembly comprising a trim panel having an opening and an insert covering the opening and assembled onto a rear face of the panel.

It is desirable for vehicle manufacturers to allow assembling the insert to the panel of such an interior trim assembly in a reliable and visually pleasing manner for ensuring high perceived quality for a user whilst allowing economical and easy fabrication of the interior trim assembly.

One of the aims of the invention is to propose a vehicle interior trim assembly comprising an insert assembled to a panel which can exhibit a satisfying perceived quality and economical and easy to fabricate.

To that end, the invention proposes a vehicle interior trim assembly, comprising:
- a trim panel comprising a panel screen having a front surface and a rear surface, the panel comprising a screen opening extending through the panel screen;
- an insert assembled to the rear surface of the panel screen, said insert comprising an insert screen covering at least partially the screen opening and at least one support flange extending from the insert screen and resting on the rear surface of the panel screen, the insert comprising a hooking flange fitted into a groove of the panel in such a manner as to prevent the insert from translating with respect to the panel such that a support flange moves away from the rear surface of the panel screen.

According to other embodiments, the interior trim assembly comprises one or several of the following feature(s), taken in isolation or in any technically feasible combination(s):
- the hooking flange is raised with respect to each support flange;
- the hooking flange forms an angle with each support flange;
- each support flange is substantially perpendicular to the hooking flange, at least in the vicinity of the hooking flange;
- the groove opens towards the rear surface of the panel screen;
- the panel comprises a panel flange extending the panel screen, the hooking flange extending along the panel screen and the groove being provided on the panel flange;
- the panel comprises a hook section delimiting the groove on the panel flange;
- it comprises a flange opening extending the screen opening in the panel flange, the hooking flange having a cover section visible through the flange opening;
- the hooking flange and the groove cooperate in such a manner that the hooking flange is inserted into the groove by inclining the insert with respect to the panel and pivoting the insert to insert the hooking flange into the groove;
- it comprises at least one pin protruding from the rear surface, each pin extending though a hole in a support flange.

The invention also relates to a vehicle door assembly comprising a door frame and a an interior trim assembly as defined above assembled to an inner face of the door frame, as well as a vehicle comprising an interior trim assembly as defined above.

The invention and its advantages will be better understood on reading the following description given solely by way of example and with respect to the appended drawings in which:

FIG. 3 is a section view of the assembled interior trim assembly taken in plane III-III on FIG. 2;

FIG. 4 is a view corresponding to that of FIG. 3 illustrating the interior trim assembly during assembly.

Figure 1:
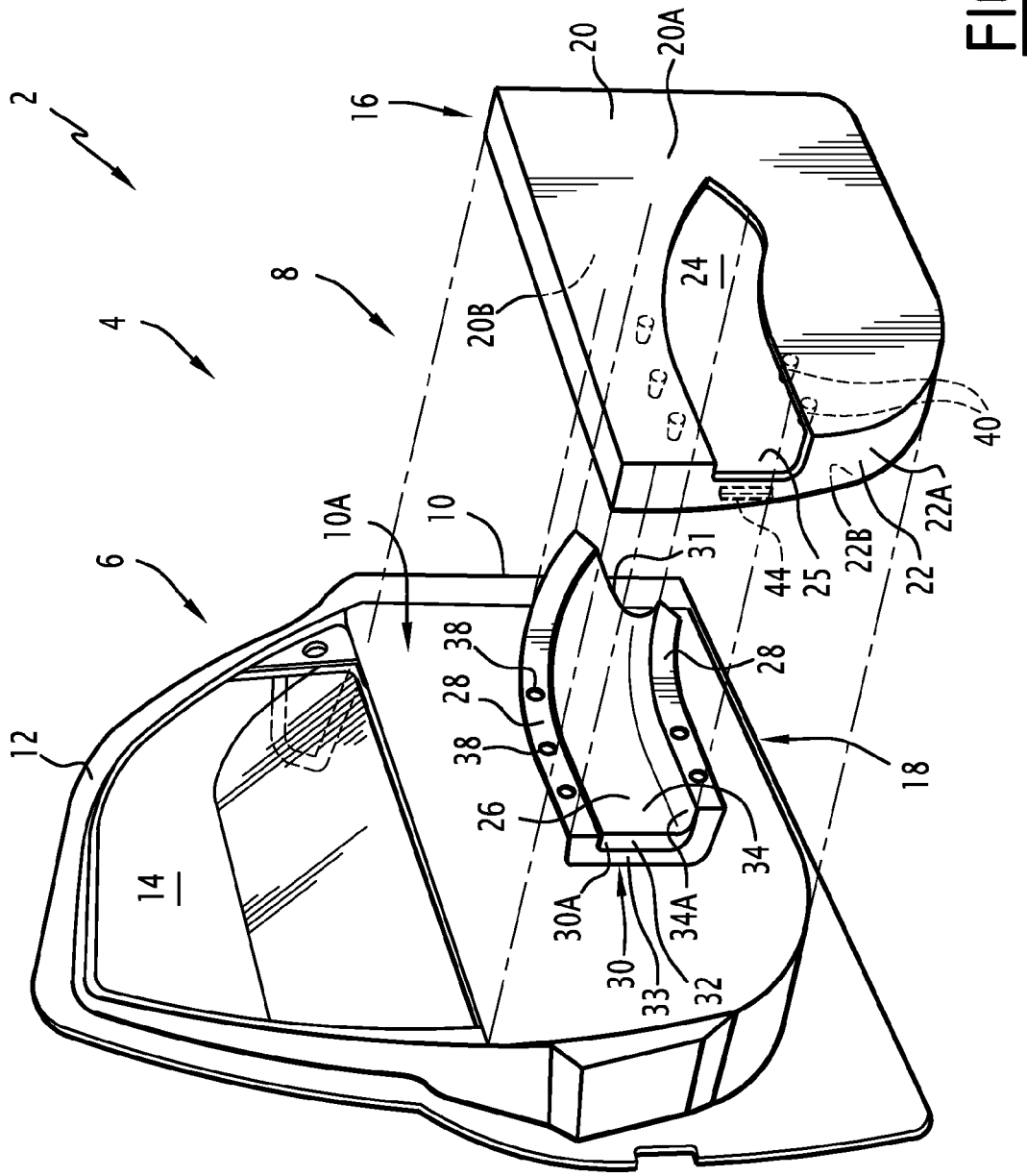
FIG. 1 is an exploded perspective view of a vehicle door comprising a door frame and an interior trim assembly.

As illustrated on FIG. 1, a vehicle 2 possesses a door 4 comprising a door frame 6 and an interior trim assembly 8 lining the door frame 6.

The door frame 6 comprises a bottom part 10 and an upper part 12, said upper part 12 defining a side window aperture 14 for receiving a side window. The interior trim assembly 8 covers an inner face 10A of the bottom part 10 facing towards the interior of the vehicle.

The interior trim assembly 8 comprises a trim panel 16 assembled to the door frame 6 and an insert 18 assembled to the panel 16.

The panel 16 covers the bottom part 10. The panel 16 comprises a panel screen 20. The panel screen 20 has a peripheral outline corresponding substantially to that of the bottom part 10. The panel screen 20 has a front surface 20A and a rear surface 20B. The front surface 20A faces opposite the door frame 6 which means that the front face 20A is facing the interior of the vehicle. The rear surface 20B faces the door frame 6.

The panel 16 comprises a raised panel flange 22 extending from the panel screen 22 towards the door frame 6. The panel flange 22 is at an angle to the panel screen 20. The panel flange 22 has a front surface 22A and a rear surface 22B. Panel flange front face 22A is, as panel screen front face 20A, facing the interior of the vehicle.

Panel screen front face 20A and panel flanges front face 22A are visible from the interior of the vehicle.

The panel 16 delimits a screen opening 24 in the panel screen 20. In the example, the panel 16 comprises a flange opening 25 extending the screen opening 24 in the flange 22. The screen opening 24 and the flange opening 25 are delimited by a closed contour. In an alternative embodiment, the panel 16 has no flange opening extending the screen opening.

The insert 18 comprises an insert screen 26 for covering at least partially the screen opening 24, at least one support flange 28 for resting on the rear surface 20B of the panel screen 20, said support flange 28 extending outwardly from the insert screen 26, and a hooking flange 30 for retaining the insert 18 on the panel 16, said hooking flange 30 extending outwardly from the insert screen 26.

In the present example, the insert 18 comprises two support flanges 28 extending along two opposed longitudinal edges of the insert screen 26. The insert 18 comprises one hooking flange 30 extending along a transverse edge of the insert screen 26. The hooking flange 30 extends transversely between the support flanges 28.

The insert screen 26 covers at least partially the screen opening 24. In the present example, the insert screen 26 covers partially the screen opening 24. The insert screen 26 has a cutout 31 for delimiting with the panel screen 20 an aperture for receiving e.g. handle and/or a control module comprising at least one switch for controlling an electric window.

The hooking flange 30 covers the flange opening 25. The hooking flange 30 has a cover section 32 covering the flange opening 25 and a hook section 33 extending the cover section 32. Cover section 32 is visible through the flange opening 25.

The insert 18 may be shaped to be functionalized. In the present example, the insert screen 26 has a front side 34 visible through the panel opening 24 shaped to be concave for forming an armrest 34A.

Figure 2:
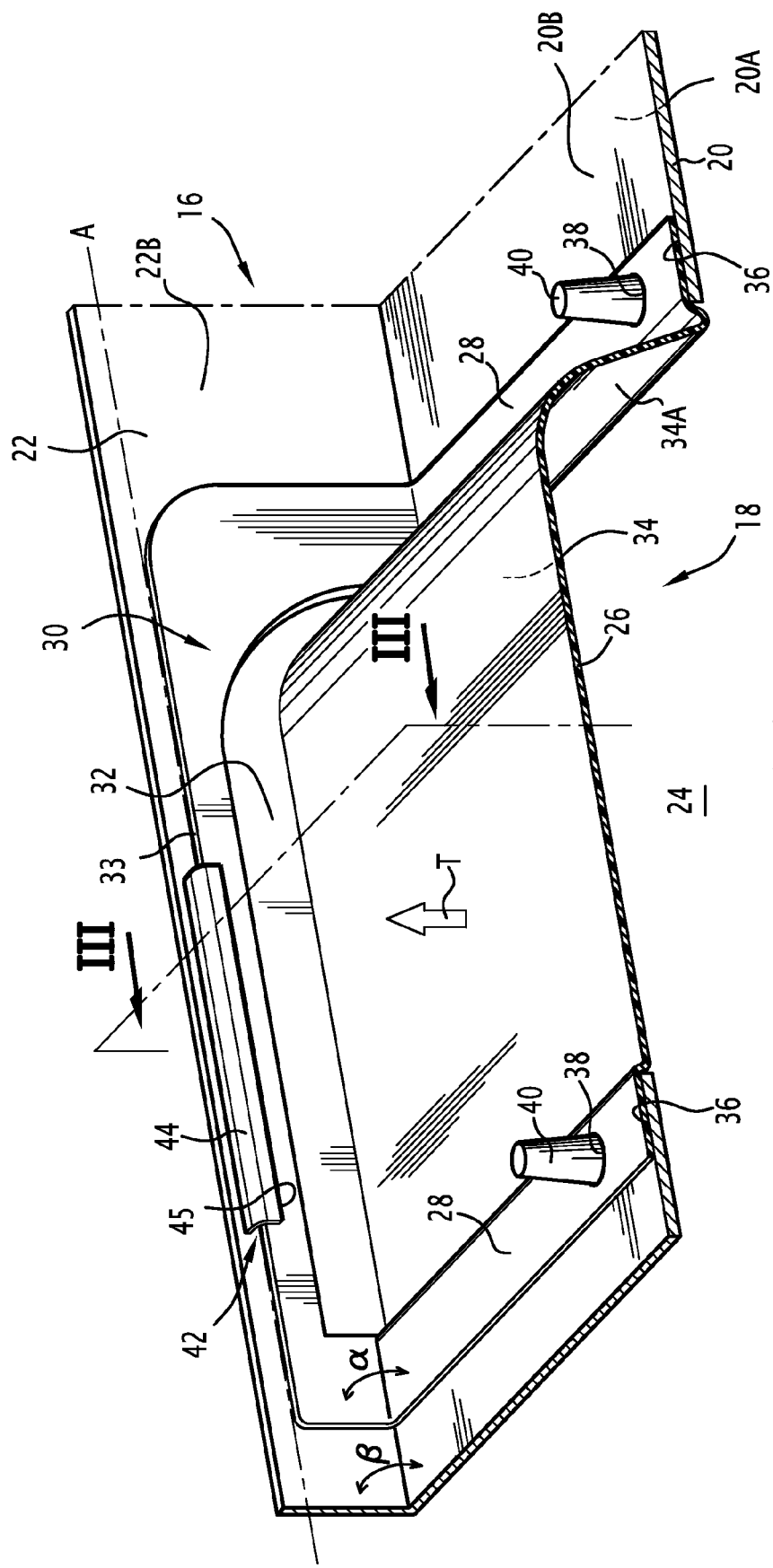
FIG. 2 is a partial cut perspective view of the interior trim assembly of FIG. 1.

As illustrated on FIG. 2, each support flange 28 rests on the rear surface 20B of the panel screen 20 at the periphery of the panel opening 24. Each support flange 28 rests on a corresponding seating 36 on the rear surface 20B. Each support flange 28 is in surface contact with the corresponding seating 36.

Each support flange 28 is provided with at least one hole 38. The panel 16 comprises pins 40 protruding from the rear face 20B of the panel screen 20, each pin 40 protruding through a respective hole 38. Advantageously, pins 40 are used to locate the insert 18 on the panel 16 and/or to fix the insert 18 on the panel 16.

The hooking flange 30 is raised with respect to each support flange 28. The hooking flange 30 forms an angle α with each support flange 28. The angle α is of approximately 90° in the example. Each support flange 28 is substantially perpendicular to the hooking flange 30, at least in the vicinity of the hooking flange 30.

The panel flange 22 is raised with respect to the panel screen 20. The panel flange 22 forms an angle β with the panel screen.

The hooking flange 30 is applied on the panel flange 22. The hooking flange 30 extends parallel to the panel flange 22. Angle β substantially equals angle α.

The panel 16 comprises a groove 42 into which the hooking flange 30 is fitted. The groove 42 and the hooking flange 30 cooperate in such a manner as to prevent the insert 18 from being translated with respect to the panel 16 such as to move the support flanges 28 away from the corresponding seatings 36 on the rear surface 20B of the panel screen 20. The cooperation of the hooking flange 30 and the groove 42 improves advantageously the localization of the hooking flange 30 on the panel flanges 22, thus exhibiting a pleasant appearance.

The groove 42 extends in an extension direction A and exhibits a U-shaped cross-section transversely to the extension direction A. The groove 42 opens towards the rear surface 20B of the panel screen 20. The groove 42 has an opening 43 (FIG. 3) facing the rear surface 20B of the panel screen 20.

The hooking section 33 of the hooking flange 30 is fitted into the groove 42 through the groove opening 43. The height of the hooking flange 30 is superior to the distance between the rear surface 20B and the opening 43 of the groove 42.

Translating the insert 18 to move the support flanges 28 away from the rear surface 20B of the panel screen 20 (upwardly on FIG. 2) is prevented by the hooking flange 30 which is retained in the groove 42. The hooking flange 30 and the groove 42 cooperate to prevent translation of the insert 18 with respect to the panel 16, namely in a translation direction T perpendicular to the support flanges 28 and the corresponding seats 36.

As illustrated on FIGS. 2 and 3, the panel 16 comprises a hooking section 44 protruding from the panel flange 22 and delimiting the groove 42 with the panel flange 22. The hooking section 44 extends away from the panel flange 22 and towards the rear surface 20B of the panel screen 20. The opening 43 of the groove 42 is delimited between the free end 45 of the hooking section 44 and the panel flange 22. As known by a man skilled in the art, the structure of the hooking section 44, at least in the portion of the hooking section in contact with the panel flange 22, is of lower than the thickness of the panel flanges 22 to avoid visible marks like sink marks on brightness on the panel flange front face 22A.

The hooking flange 30 and the hooking section 44 thus mutually engage in such a manner as to prevent the insert 18 from being translated with respect to the panel 16 such as to move the support flanges 28 away from the rear surface 20B of the panel screen 20. This feature helps advantageously to keep the trim assembly 8 as one piece in case of vehicle impact, namely side impact.

The covering section 32 of the hooking flange 30 protrudes with respect to hooking section 33 into the flange opening 25 for providing surface continuity between a front face 32A of the covering section 32 and the panel flange front face 22A.

The operation of assembling the insert 18 to the panel 16 is illustrated on FIG. 4.

The insert 18 is initially inclined with respect to the panel 16. In the inclined position, each support flange 28 is inclined with respect to the corresponding seating 36. The insert 18 is inclined such as to allow placing the hooking section 33 of the hooking flange 30 under the hooking section 44, in register with the groove 42. The insert 18 must be inclined to pass the hooking flange 30 below the hooking section 44.

The insert 18 is then pivoted as illustrated by arrow P to bring the support flanges 28 to rest onto the corresponding seats 36. The insert 18 is pivoted about an axis substantially parallel to the extension direction A. Upon pivoting of the insert 18, the hooking flange 30 is inserted into the groove 42. Besides, each pin 40 is fitted into the corresponding hole 38.

The insert 18 is thus in the position as illustrated on FIGS. 2 and 3. In this position, the hook flange 30 engaging the hook section 44 prevents the insert 18 from being translated away from the panel 16 perpendicularly to the support flanges 28.

The pins 40 engaging the holes 38 prevent the insert 18 from sliding along the rear surface 20B of the panel screen 20.

The insert 18 is thus reliably assembled to the panel 16.

The insert 18 may be additionally mechanically fixed to the panel 16 by any suitable means, such as bonding, welding, namely ultrasonic welding, and/or heating of the pins 40.

The interior trim assembly 8 is easy and economical to manufacture. The panel 16 and the insert 18 are integrally provided with fixing means (hooking flange 30 and groove 42) preventing disassembly of the insert 18 from the panel 16. The insert 18 can be assembled to the panel 16 easily by an operator by a simple movement of rotation.

The fixing means provided on the back of the panel 16 and the insert 18 are not visible to the user. The interior trim assembly 8 can thus exhibit a pleasing appearance.

The visible surfaces of the panel 16 (panel screen front face 20A and panel flange front face 22A) and the visible surfaces of the insert 18 (front side 34 and cover section front face 32A) may be different in color and/or finishing material. The panel 16 may be provided with visible surfaces in plastic material. The insert 18 may be provided with visible surfaces covered with a textile material.

The interior trim assembly applies to door interior trim assemblies and more generally to interior trim assembly for any part of the interior of a vehicle.

The invention claimed is:

1. Vehicle interior trim assembly, comprising:
   a trim panel (16) comprising a panel screen (20) having a front surface (20A) and a rear surface (20B), the panel comprising a screen opening (24) extending through the panel screen (20);
   an insert (18) assembled to the rear surface (20A) of the panel screen (20), said insert (18) comprising an insert screen (26) covering at least partially the screen opening (24) and at least one support flange (28) extending from the insert screen (26) and resting on the rear surface (20B) of the panel screen (20), the insert (18) comprising a hooking flange (30) fitted into a groove (42) of the panel (16) in such a manner as to prevent the insert (18) from translating with respect to the panel (16) such that a support flange (28) moves away from the rear surface (20B) of the panel screen (20).

2. Interior trim assembly as in claim 1, wherein the hooking flange (30) is raised with respect to each support flange (28).

3. Interior trim assembly as in claim 1, wherein the hooking flange (30) forms an angle ($\alpha$) with each support flange (28).

4. Interior trim assembly as in claim 1, wherein each support flange (28) is substantially perpendicular to the hooking flange (30), at least in the vicinity of the hooking flange (30).

5. Interior trim assembly as in claim 1, wherein the groove (42) opens towards the rear surface (20B) of the panel screen (20).

6. Interior trim assembly as in claim 1, wherein the panel (16) comprises a panel flange (22) extending the panel screen (20), the hooking flange (30) extending along the panel screen (20) and the groove (42) being provided on the panel flange (22).

7. Interior trim assembly as in claim 6, wherein the panel (16) comprises a hook section (44) delimiting the groove (42) on the panel flange (22).

8. Interior trim assembly as in claim 6, comprising a flange opening (25) extending the screen opening (24) in the panel flange (22), the hooking flange (30) having a cover section (32) visible through the flange opening (25).

9. Interior trim assembly as claim 1, wherein the hooking flange (30) and the groove (42) cooperate in such a manner that the hooking flange (30) is inserted into the groove (42) by inclining the insert (18) with respect to the panel (16) and pivoting the insert (18) to insert the hooking flange (30) into the groove (42).

10. Interior trim assembly as in claim 1, comprising at least one pin (40) protruding from the rear surface, each pin (40) extending though a hole (38) in a support flange (28).

11. Vehicle door comprising a door frame (6) and an interior trim assembly as in claim 1 lining an inner face of the door frame (6).

12. Vehicle, namely automotive vehicle, comprising an interior trim assembly as in claim 1.

* * * * *